United States Patent [19]

Yokokura et al.

[11] Patent Number: 4,941,744
[45] Date of Patent: Jul. 17, 1990

[54] INTEGRATED-PHOTOCIRCUIT INTERFEROMETER

[75] Inventors: Takashi Yokokura; Nobuo Hori; Hiroaki Shimozono; Satoru Niimura, all of Tokyo, Japan

[73] Assignee: Tokyo Kogaku Kikai Kabushiki Kaisha, Tokyo, Japan

[21] Appl. No.: 215,684

[22] Filed: Jul. 6, 1988

[30] Foreign Application Priority Data

Jul. 7, 1987 [JP] Japan ................... 62-167726

[51] Int. Cl.$^5$ ........................... G01B 9/02
[52] U.S. Cl. ................................ 356/358
[58] Field of Search ................. 356/345, 358

[56] References Cited

U.S. PATENT DOCUMENTS

4,717,255 1/1988 Ulbers ................. 356/358 X
4,744,661 5/1988 Ulbers et al. ........... 356/358

Primary Examiner—Davis L. Willis
Assistant Examiner—Matthew W. Koren
Attorney, Agent, or Firm—Finnegan, Henderson, Farabow, Garrett and Dunner

[57] ABSTRACT

An integrated-photocircuit interferometer (20) comprises a substrate (21) in which coherent light for measurement emitted from a light source (23) is directed through an exit waveguide (22) toward a corner cube prism (34) which can be movable with an object to be measured. The light reflected back from the prism (34) can enter an inlet waveguide (33) having branch waveguides (35, 36) which split the incident measurement light. Part of the light transmitted through the exit waveguide (22) is transferred to reference waveguides (26, 27) which provide different optical path lengths for the light propagated therethrough. The "reference beams of light" which has been transmitted through the different lengths of optical paths provided by the reference waveguides (26, 27) are introduced into the branch waveguides (35, 36) where interference occurs between the reference beams and the split beams of incident light from the corner cube prism (34). The interference will cause changes in brightness detected by photodetectors (37, 38) as the prism (34) is shifted toward or away from the interferometer (20). Since there is an optical path length difference between the reference waveguides (26, 27), a great number of changes can be detected by the photodetectors for a shift of the prism. Thus, the amount of the shift can be determined to a high resolution. In addition, the relationship in phase between the detected brightnesses will change depending on the direction of movement of the corner cube prism (34). The direction of the prism's movement can thus be detected.

8 Claims, 11 Drawing Sheets

INTEGRATED-PHOTOCIRCUIT INTERFEROMETER

BACKGROUND OF THE INVENTION

1. Field of the Invention:

The present invention relates to a high resolution integrated-photocircuit interferometer capable of finding the direction of phase variation of the measured light, or the direction in which the optical path of the measured light increases or decreases, on the basis of an interference signal which varies in response to the change in the optical path length of the measured light.

Figure 13:
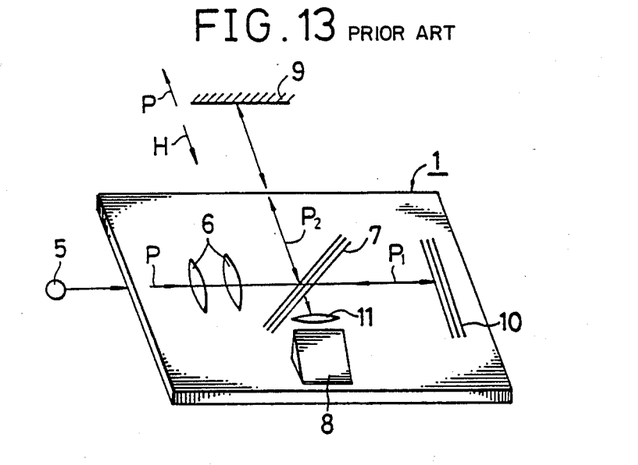
FIG. 13 is an illustration showing a prior art integrated-photocircuit interferometer.
Figure 14:
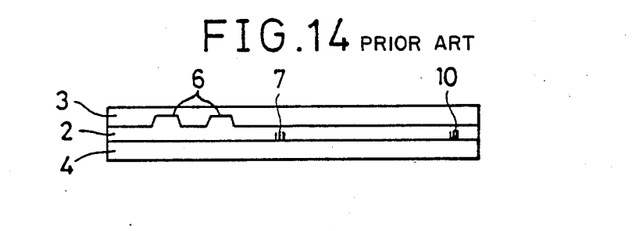
FIG. 14 is a cross sectional view showing the prior art integrated-photocircuit interferometer.

2. Description of the Prior Art:

A recursive optical system type integrated-photocircuit interferometer is disclosed in Japanese Utility Model Publication No. 15522/1981, which is illustrated in FIGS. 13 and 14.

In FIGS. 13 and 14, 1 denotes a thin-walled substrate in which a two-dimensional wave-guiding paths are formed. The thin-walled substrate 1 consists of three thin layers 2, 3 and 4. Of these layers, at least the intermediate one 2 is capable of transmitting light. The thin layer 2 has a refractive index which is greater than those of the layers 3 and 4 on both sides. Coherent light P emitted from a light source 5 enters the substrate 1. The coherent light P is reflected by both of the interfaces between the layer 2 and the contiguous layers 3 and 4 and is propagated within the intermediate layer 2. The substrate 1 has a collimator lens system 6. The coherent light P entering the layer 2 is converted into a parallel beam of rays. The parallel beam is split into a reference beam $P_1$ and a measurement beam $P_2$ by a half mirror system 7. The reference beam $P_1$ is reflected by a reference mirror 10 formed in the substrate 1 and is thus returned back to the half mirror system 7. The measurement beam $P_2$ is reflected by the object or mirror 9 for measurement and is thus returned back to the half mirror system 7. The thus returned measurement beam $P_2$ and reference beam $P_1$ are united by the half mirror system 7 to interfere with each other, and the resultant interference beam is guided to a measuring lens 11. The interference beam is projected out of the layer through a prism 8.

Figure 15:
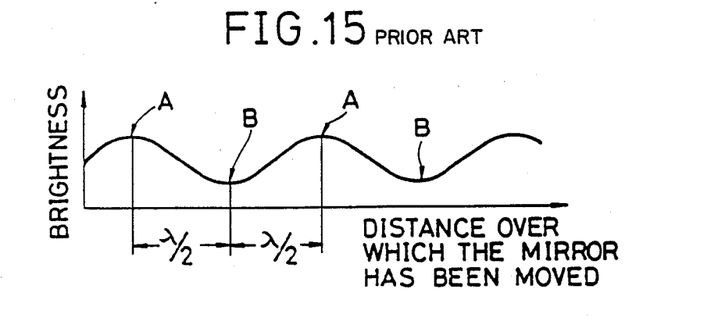
FIG. 15 is a graph showing the change in brightness detectecd by the prior art integrated-photocircuit interferometer.

The interference beam emitted from the prism 8 is dark when the difference between the optical paths of the measurement beam $P_2$ and of the reference beam $P_1$ is an odd multiple of $\lambda/2$, $\lambda$ being the wavelength of the coherent light P, while it is bright when the difference is an even multiple of $\lambda/2$. Therefore, a movement of the mirror 9 for measurement in the direction of arrow G will produce an interference signal depending on the interference beam, which signal changes alternately from dark B to bright A and then from bright A to dark B, as shown in FIG. 15, each time the amount of movement increases by $\lambda/2$. Therefore, it is possible to derive the amount of movement of the mirror 9 for measurement by counting the bright and dark portions A and B, and thus it is possible to determine the length of the observed object by counting the amount of the movement from the origin.

Such prior art integrated-photocircuit interferometer, however, has a disadvantage in that a movement of the mirror for measurement in the opposite direction H will cause a similar alternate pattern of bright and dark levels A and B in the signal, and hence it is impossible to determine the direction of change in the phase of the measurement beam. Besides, the integrated photocircuit interferometer has another disadvantage in that it is difficult with this apparatus to have a resolution finer than $\lambda/2$. Further, in this type of interferometer, part of the measurement beam $P_2$ reflected by the mirror 9 will be reflected by the half mirror 7 and will return back to the light source 5. Similarly, part of the reference beam $P_1$ will return back to the light source 5 after passing through the half mirror 7. This returning light will affect the output of the light source 5, interfering with the fine measurement.

SUMMARY OF THE INVENTION

The present invention was made in an attempt to overcome the above-described disadvantages.

A first object of the present invention is therefore to provide an integrated-photocircuit interferometer which allows a more accurate measurement of the amount of a mirror's movement than the prior art.

The first object can be achieved, according to a first aspect of the present invention, by providing an integrated photocircuit interferometer with a thin-walled substrate having formed therein:

an exit waveguide for directing coherent light for measurement from a light source toward an object;

an inlet waveguide having a plurality of branch waveguides for receiving said light for measurement reflected from said object and for guiding said received light through said plurality of branch waveguides to a corresponding plurality of photodetectors; and reference waveguides optically connecting said exit waveguide to said brach waveguides for extracting a plurality of reference beams from the light for measurement propagating through said exit waveguide and for guiding each of said reference beams into a corresponding one of said branch waveguides, said reference waveguides providing different optical path lengths for said plurality of reference beams.

In accordance with the first aspect of the present invention, the interferometer is operated as follows: the beam for measurement emitted from the exit waveguide enters the inlet waveguide after being reflected by the object, and then it is propagated into the branch waveguides of the inlet waveguide.

Within the branch waveguides, the measurement light interferes with the reference beams which have different optical path lengths, so that the photodetectors will detect different levels of brightness. This allows to determine the amount of movement of the object at a higher accuracy than before depending on the changes in brightness detected by the photodetectors, and further to determine the direction of movement of the object.

A second object of the present invention is to provide an integrated photocircuit interferometer of the above-defined type, in which the optical path length differences for the plurality of the reference beams can be adjusted as desired.

In accordance with a second aspect of the present invention, the second object can be achieved by providing the above-defined integrated-photocircuit interferometer with:

optical path adjusting means for said plurality of reference waveguides;

an adjusting waveguide formed in said thin-walled substrate and optically connected to each of the branch waveguides and guiding the reference beams from the branch waveguides to an adjustment photodetector for adjusting the difference between the optical path lengths of the plurality of reference beams, wherein said optical path adjusting means can be adjusted depending on the output from the adjustment photodetector.

In accordance with the second aspect of the invention, the photodetector optically connected to the adjusting waveguide will detect the interference between the reference beams, which interference results from the difference in length between the otptical paths. The optical path adjusting means is adjusted on the basis of the output signal from the photodetector so as to adjust the difference between the optical paths of the reference light propagated through the reference waveguides.

A third object of the present invention is to provide an integrated photocircuit interferometer in which the light beam reflected from the object is directed so as not to return back to the light source.

In accordance with a third aspect of the present invention, the third object is achieved by providing the integrated photocircuit interferometer according to the first aspect with:

a light source for generating linearly porarized coherent light for measurement; and measurement-light polarizing means provided in said thin-walled substrate for polarizing said measurement light reflected from said object in such a manner that said reflected measurement light will not enter said exit waveguide but will enter said inlet waveguide.

In accordance with the third aspect, the coherent light emitted from the exit waveguide is polarized by the polarizing means and the coherent light reflected from the object is again polarized by the same means and then enters the inlet waveguide. Thus, the coherent light reflected from the object is prevented from returning back to the light source through the exit waveguide.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
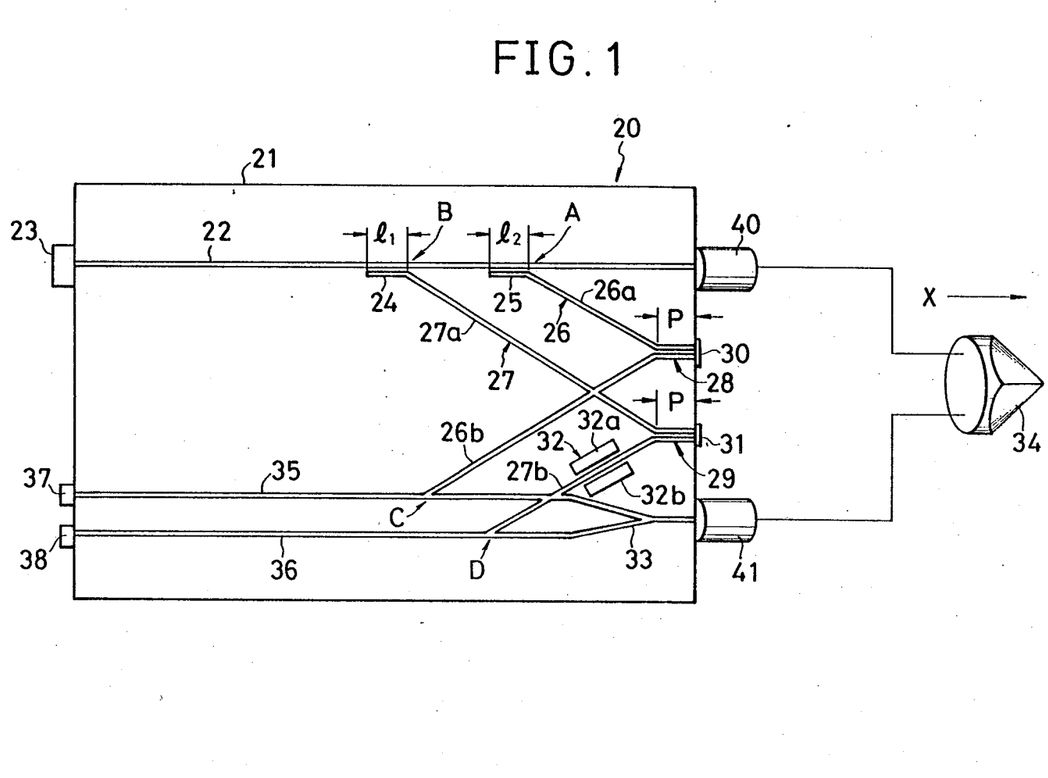
FIG. 1 is a diagram showing the construction of a first embodiment of the present invention which achieves the first object described above.

FIG. 1 is a plan view of an integrated-photocircuit interferometer.

FIG. 1, 20 designates the integrated-photocircuit interferometer. The interferometer 20 has a square substrate 21 with the sides several tens of millimeters long, which is made of, for example, lithium niobate. The substrate 21 has an exit waveguide 22 formed therein. The exit waveguide 22 is formed by selective thermodiffusion of titanium. 23 designates a laser, e.g. a semiconductor laser, provided on an end face of the substrate 21, which emits a beam of coherent light. The beam emitted from the laser 23 is guided into the exit waveguide 22 and is propagated therethrough as a transverse electric (TE) wave.

24 and 25 designate directional couplers comprising waveguides formed 2 or 3 $\mu$m away from the exit waveguide 22 and parallel with it. Part of the light propagated through the exit passage 22 is transferred to the directional couplers 24, 25. The coupling length $l_1$ of the one coupler 24 is longer than that $l_2$ of the other coupler 25 so that equal amount or power is transferred to both of them. 26 and 27 designate first and second reference waveguides, respectively, which have an optical path length difference of $\lambda/8$. Here, the optical path length of the second reference waveguide 27 is designed such that the optical path length difference for the first reference waveguide, i.e. the length of the optical path from point A via a corner cube prism 34 to point C minus the length of the optical path from point A to point C, is different by an amount of $(N+\frac{1}{4})\lambda$, N being an integer, from the optical path length difference for the second reference waveguide, i.e. the length of the optical path from point B via the corner cube prism 34 to point D minus the length of the optical path from point B to point D. If both the optical paths via the corner cube prism are of the same length, then the optical path length difference between the first and second reference waveguides may be $\lambda/4$ multiplied by an interger, and a description will be given below on such an assumption. The first and second reference waveguides 26 and 27 comprise two segments, 26a,26b and 27a,27b, and have directional couplers 28 and 29, respectively, provided at their middle portions. The directional couplers 28, 29 comprise waveguides formed 2 or 3 $\mu$m away from, and parallel to, each other. Their coupling length p is one half of the complete coupling length. Mirrors 30 and 31 are secured to the ends of the directional couplers 28 and 29, respectively, which in effect contribute to couple the waveguide segments with a complete coupling length, i.e. 2p, whereby the light propagated through the upstream segments 26a, 27a of the first and second reference waveguides 26, 27 are entirely transferred to the downstream segments 26b, 27b.

The embodiment shown includes reflective directional couplers 28 and 29 for compactness purposes, but, alternatively, curved waveguides may also be formed as the reference waveguides.

32 designates an optical path length adjusting means which comprises a pair of electrodes 32a and 32b formed on opposite sides of the second reference waveguide segment 27b in such a manner that an electric field can be applied to the second reference waveguide 27b in the direction of the z-axis of the substrate 21. A voltage applied between these electrodes 32a, 32b will cause electro-optical effect which results in a change in the refractive index of the second reference waveguide segment 27b interposed between the electrodes. That is, by applying a suitable voltage between the electrodes 32a, 32b of the optical path length adjusting means 32, a change in the refractive index of the second reference waveguide segment 27b can be produced, whereby the optical path length difference between the first and second reference waveguides 26 and 27 can be adjusted to a value of $(N+\frac{1}{4})\lambda$, where N is an integer. 33 designates an inlet waveguide which splits the reflected beam from the corner cube prism 34, i.e. the object, into two separate beams. 35 designates a first branch waveguide for guiding one of these beams split by the inlet waveguide 33 together with the beam from the first reference waveguide 28 (hereinafter called first reference beam) toward a first photodetector 37. Within the first branch 35, the two beams of light interfere with each other. 36 designates a second branch waveguide for guiding the other one of the split beams together with the beam from the second reference waveguide 27 (hereinafter called second reference beam) toward a second photodetector 38. Within the second branch 36, the two beams of light interfere with each other in a similar manner. 40 designates a rod lens (i.e. collimator lens) for directing the beam of light propagated through the exit waveguide 22 toward the corner cube prism 34. 41 designates another rod lens for guiding the reflected beam of light from the corner cube prism 34 into the inlet waveguide 33.

Figure 2:
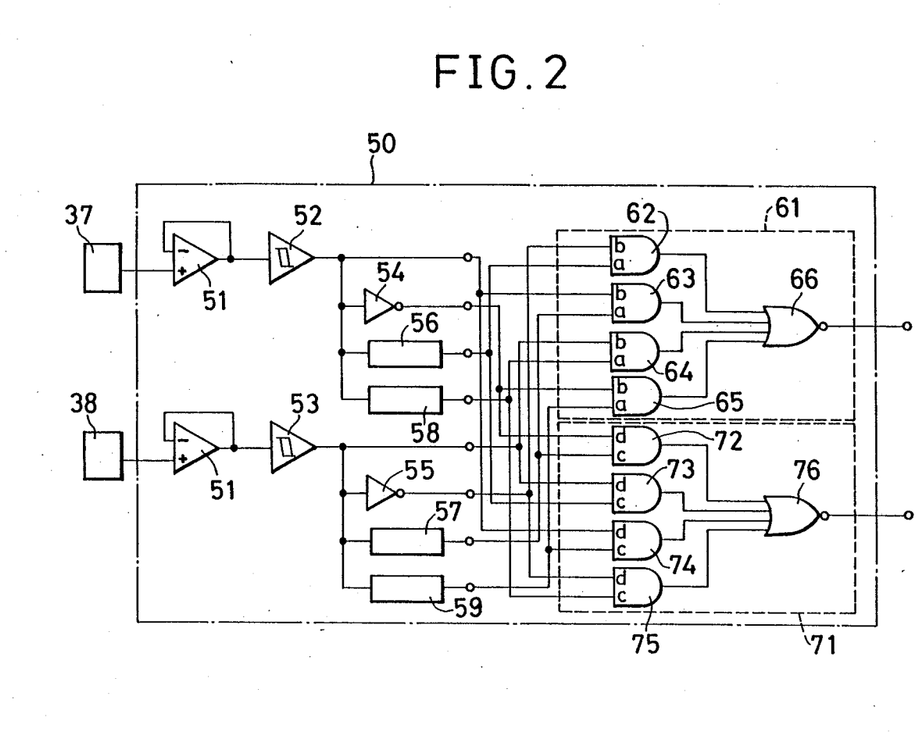
FIG. 2 is a circuit diagram showing the signal processing circuit of the first embodiment.

FIG. 2 shows a signal processing circuit 50 for determining the distance over which the corner cube prism 34 has been moved, in which 51 designates amplifiers for amplifying the reception signals outputted from the photodetectors 37, 38. 52 and 53 designate Schmitt trigger circuits for shaping the sinusoidal output signals from the amplifiers 51 into a rectangular waveform. 54 and 55 designate inverters. 56 and 57 designate one-shot circuits which generate a count pulse upon the rise of the rectangular signal from the schmitt trigger circuits 56, 57. 58 and 59 designate one-shot circuits which generate a count pulse upon the decay of the rectangular signal from the schmitt trigger circuits 52, 53. 61 designates an up-gate circuit which comprises AND circuits 62, 63, 64, 65 and a NOR gate 66, and which allows the count pulses generated by the one-shot circuits 56-59 to pass therethrough only when the corner cube prism 34 is moved in the z-direction. 71 designate a down-gate circuit which comprises AND gates 72, 73, 74, 75 and a NOR circuit 76, and which allows the count pulses generated by the one-shot circuits 56-59 to pass therethrough only when the corner cube prism 34 is moved in the reversed direction, i.e. -x-direction.

Figure 3:
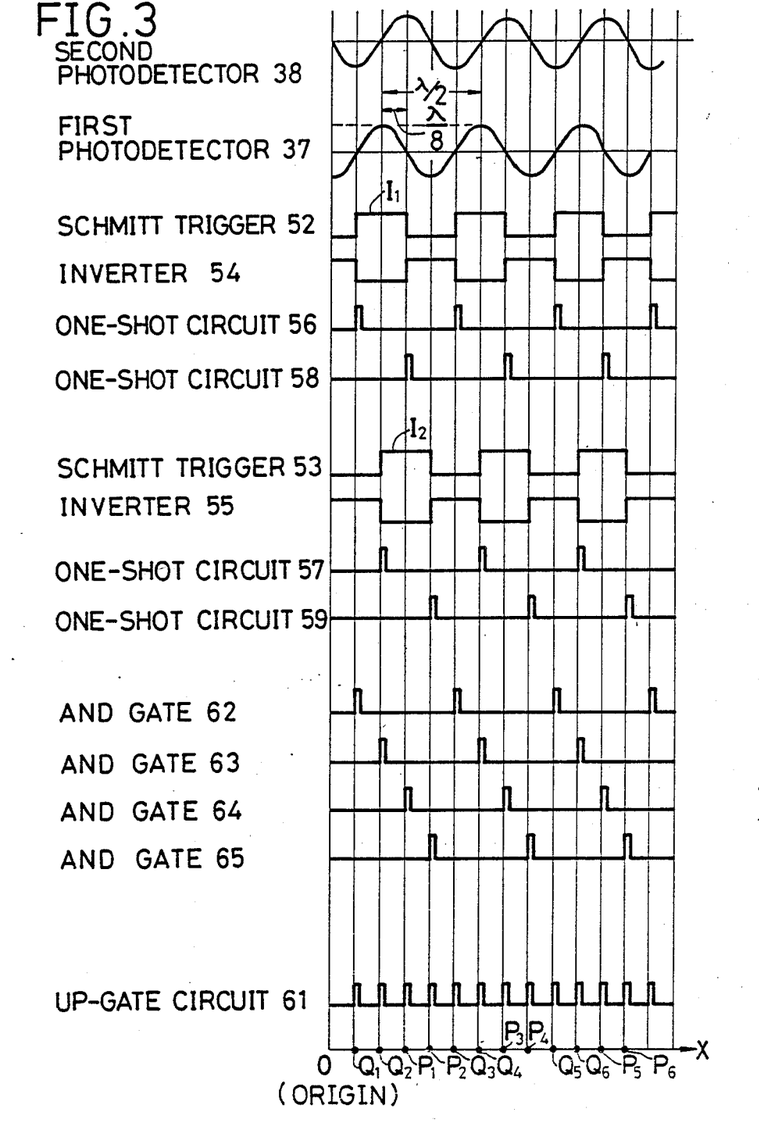
FIGS. 3 and 4 are timing charts for the signal processing circuit of the first embodiment.

Next, the use and operation of the above-described embodiment will be explained with reference to FIGS. 3 and 4.

First, the corner cube prism 34 is placed at the original point (the position shown). Next, a suitable voltage is applied between the electrodes 32a, 32b of the optical path length adjusting means so as to adjust the optical path length difference between the first and second reference waveguides 26, 27 to a value of $(N+\frac{1}{4})\lambda$. Coherent light is emitted from the laser 23 while the voltage is applied between the electrodes 32a, 32b. The coherent light, hereinafter called "measurement light", is propagated through the exit waveguide 22. The measurement light propagated through the exit waveguide 22 is directed through the rod lens 40 toward the corner cube prism 34. Part of the coherent light propagated through the exit waveguide 22 is transferred to the reference waveguides 26, 27 by means of the directional couplers 24, 25. The measurement light reflected from the corner cube prism 34 will enter the inlet waveguide 33 through the rod lens 41. The measurement light is split into two beams in the inlet waveguide. One of the two split beams is propagated through one branch waveguide 35 and interferes with the first reference beam from the first reference wave guide 26, and the resultant beam is guided to the first photodetector 37. The other of the two split beams is propagated through the second branch waveguide 36 and interferes with the second reference beam from the second reference waveguide, and the resultant beam is guided to the second photodetector 38.

Then, the prism 34 is moved from the original point in the x-direction. Brightness on the light-receiving surface of the first photodetector 37 changes periodically as the prism is moved, the period corresponding to an amount of $\lambda/2$ of the prism's movement. The brightness is converted by the photodetector into a first electrical brightness signal which has a sinusoidal waveform as shown in FIG. 3. Similarly, the brightness on the light-receiving surface of the second photodetector 38 is converted by the second photodetector 38 into a second electrical brightness signal which has a similar sinusoidal waveform as shown in FIG. 3. The second brightness signal has a delay in phase of $\pi/2$ relative to the first brightness signal, since the second reference waveguide 27 has an optical path length which is $\lambda/4$ longer than that of the first reference waveguide 36. The first and second brightness signals are shaped by the schmitt trigger circuits 52, 53 into rectangular signals $I_1$ and $I_2$, as shown in FIG. 3.

A count pulse is generated upon the rise (points $Q_1$ $-Q_2$ in FIG. 3) or decay (points $P_1$-$P_6$ in FIG. 3) of the first and second rectangular signals $I_1$ and $I_2$ by the one-shot circuits 56-59. Since there is a phase difference of $\lambda/2$ between the first and second rectangular signals $I_1$ and $I_2$, a count pulse is generated each time the corner cube prism 34 has moved a distance of $\lambda/4$.

The count pulses are supplied to the inputs a of the AND gates 62-65. The other inputs b of the AND gates 62-65, which are connected to receive the outputs from the inverter 55, schmitt triggers 52 and 53 and inverter 54, respectively, are high when the count pulses are supplied. The count pulses are outputted from the up-gate circuit 61 through the NOR gate 66.

On the other hand, the count pulses are also supplied to the inputs c of the AND gates 72-75 in the down-gate circuit 71. At that time, the input levels at the other inputs d of the AND gates 72-75, or the output levels of the inverter 54, schmitt triggers 53, 52 and inverter 55, respectively, are low so that the count pulses cannot then pass through the AND gates 72-75. Thus, the count pulses are outputted through the up-gate circuit 61 only, when the prism 34 is moving in the x-direction.

Figure 4:
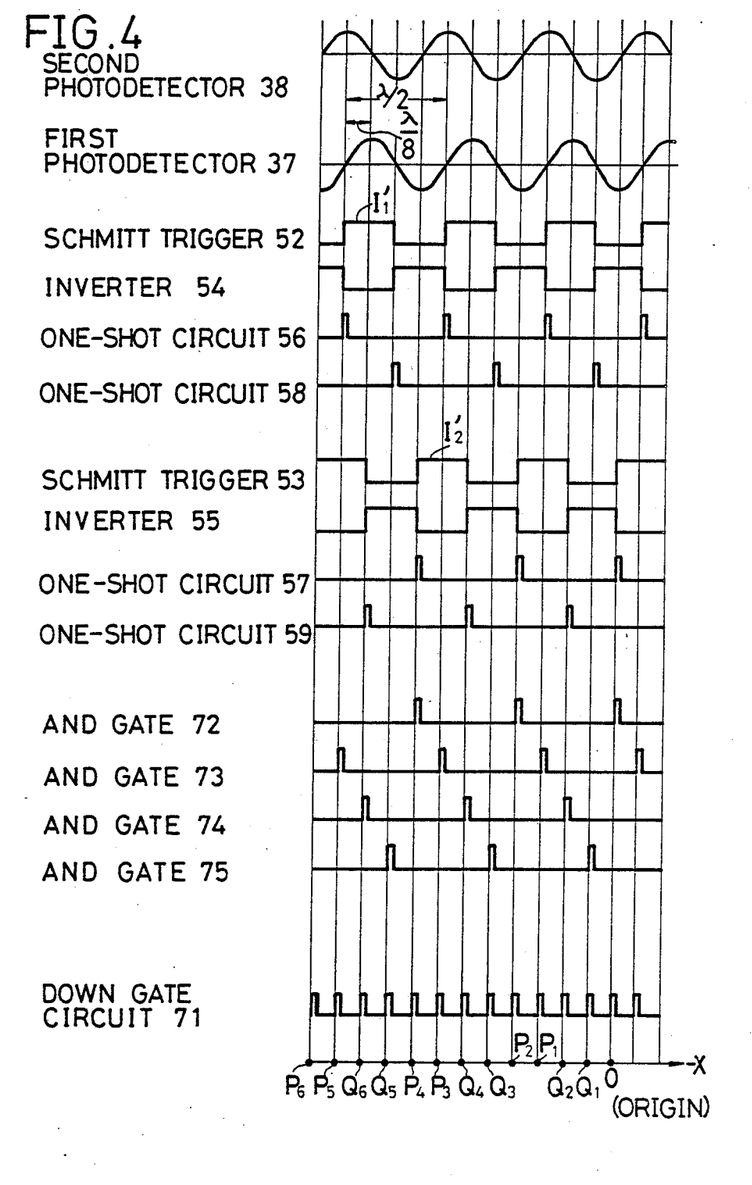

On the contrary, when the corner cube prism 34 is moved toward the substrate 21, i.e. in the x-direction (for example, from point $P_6$ toward the origin O in FIG. 3), the first brightness signal from the first photodetector 37 has a delay in phase of $\pi/2$ relative to the second brightness signal from the second photodetector 38, as shown in FIG. 4. The first and second brightness signals are shaped by the schmitt triggers 52, 53 into rectangular waves gives $I_1'$ and $I_2'$. See FIG. 4. A count pulse is generated by the one-shot circuits 56–59 upon the rise (points $P_1$–$P_6$ in FIG. 4) or decay (points $Q_1$–$Q_6$ in FIG. 4) of the shaped rectangular signals $I_1'$ and $I_2'$. Since the rectangular signals $I_1$, and $I_2'$ have a phase delay of $\pi/2$ therebetween, a count pulse is generated each time the corner cube prism 34 has moved a distance of $\lambda/8$. The count pulses are supplied to the inputs c of the AND gates 72–75. When the count pulses are supplied, the other input levels d of the AND gates 72–75, i.e. the outputs from the inverter 54, schmitt triggers 53 and 52 and inverter 55, respectively, are high as shown in FIG. 4, so that the supplied count pulses are outputted from the down-gate circuit 71 through the NOR gate 76. The count pulses are also supplied to the AND gates 62–65 of the up-gate circuit 61. At that time, the input levels of the other inputs b of the AND gates 62–65, i.e. the output levels from the inverter 55, schmitt triggers 52 and 53 and inverter 54, respectively, are low. Thus, when the corner cube prism is moved in the - x-direction, or toward the substrate, the count pulses are allowed to pass through the down-gate circuit 71 only, and they cannot pass through the AND gates 62–65 of the up-gate circuit.

Therefore, the distance from the original point over which the prism 34 is moved can be determined to an accuracy of $\lambda/8$ by subtracting the number of count pulses outputted from the down-gate circit 71, from the number of count pulses outputted from the up-gate circuit 61. Also, the direction of movement of the corner cube prism 34 can be determined depending on which of the gate circuits 61 and 71 is then outputting the count pulses.

Figure 5:
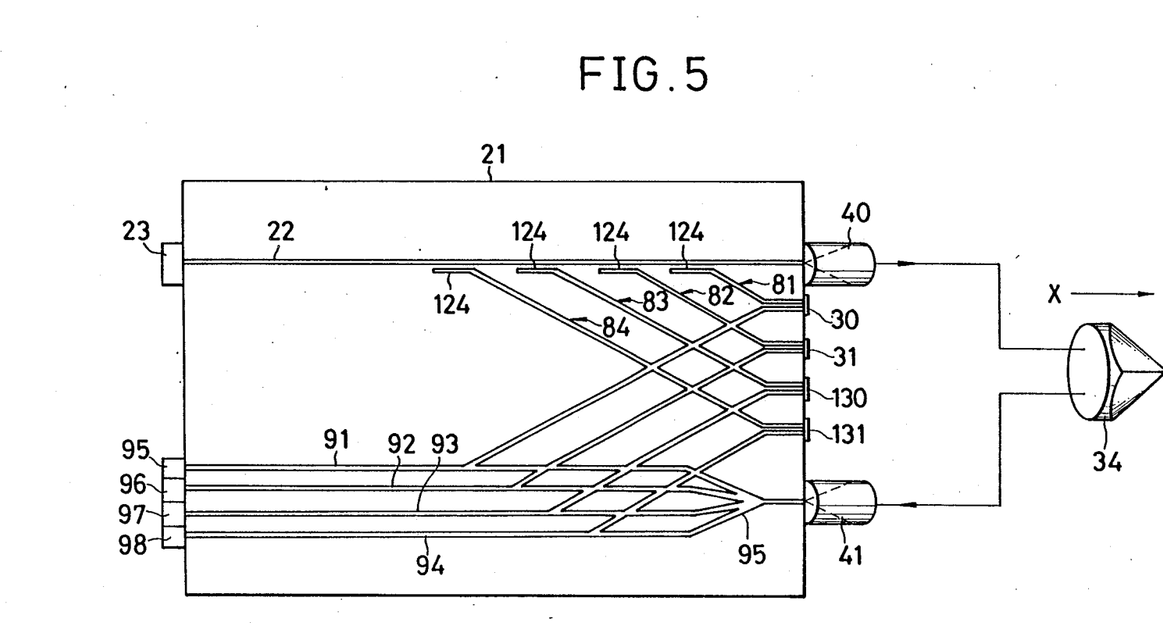
FIG. 5 is a diagram showing the construction of a second embodiment of the present invention which achieves the first object described above.

Referring now to FIG. 5, there is shown a second embodiment of the present invention which achieves the first object previously described. It comprises a substrate 21 in which there are formed first, second, third and fourth reference waveguides 81, 82, 83 and 84, respectively, as well as first, second, third and fourth branch waveguides 91, 92, 93 and 94, respectively. The second, third and fourth reference waveguides 82, 83 and 84 have optical path lengths which are $(N+\frac{1}{8})\lambda$ longer than those of the first, second and third reference waveguides 81, 82 and 83, respectively. 95, 96, 97 and 98 designate photodetectors; 124 designates of directional coupler; 130, 131 designate mirrors; 95 designates an inlet waveguide.

Figure 6:
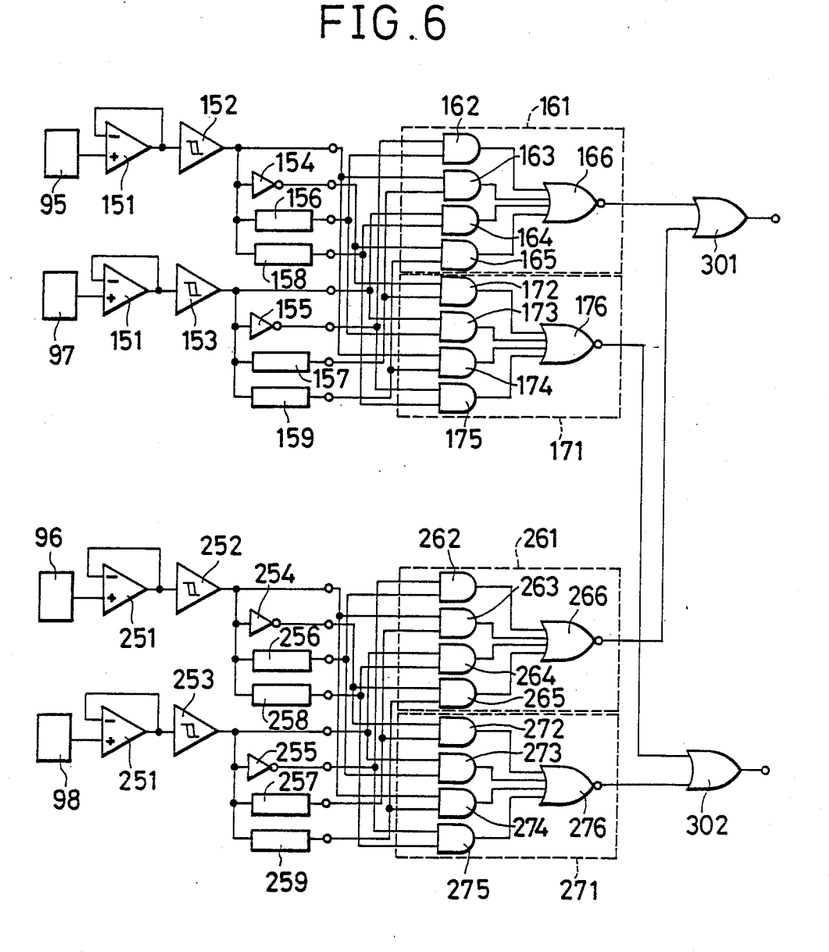
FIG. 6 is a diagram showing the signal processing circuit of the second embodiment.

FIG. 6 shows a signal processor associated with the above-described integrated-photocircuit interferometer for determining the distance over which the corner cube prism 34 has been moved, as well as the direction thereof. It comprises two sets of the signal processing circuits 50 shown in FIG. 2. A brief description of this will be given below, with reference to FIG. 7.

Figure 7:
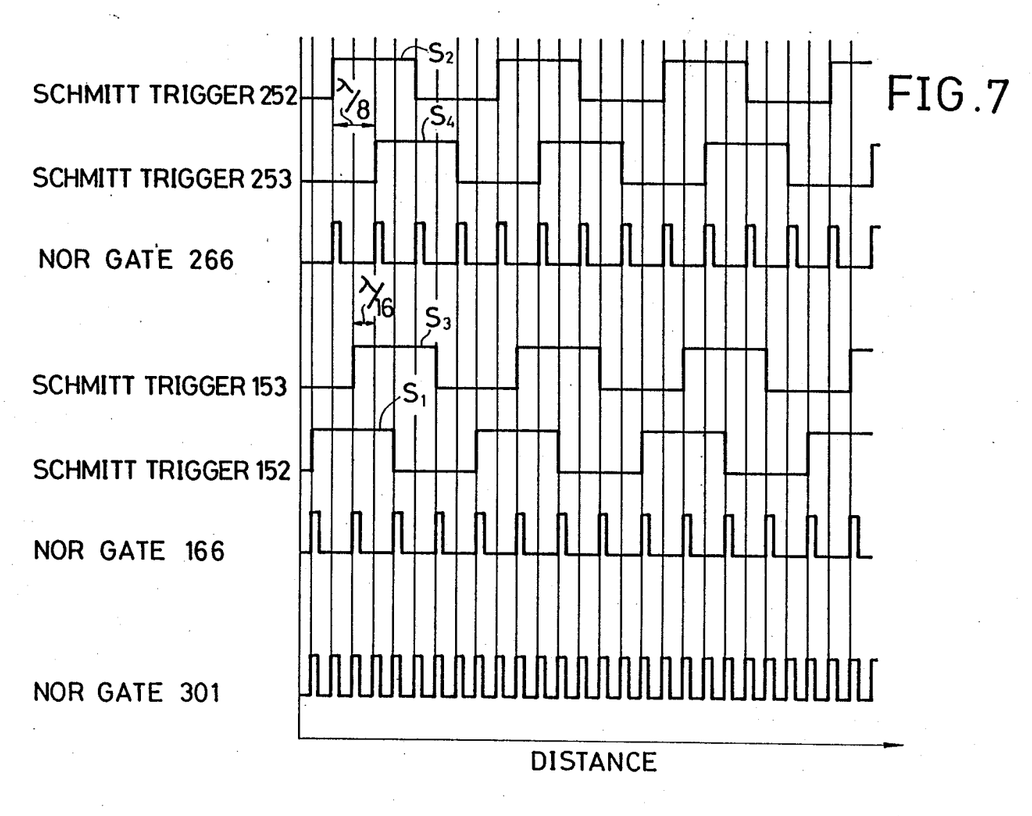
FIG. 7 is a timing chart for the signal processing circuit of the second embodiment.

As the corner cube prism 34 is moved in the x-direction, the schmitt triggers 152, 153, 252 and 253 will produce first through fourth rectangular signals $S_1$ through $S_4$ in a similar manner to the previously described embodiment. The second, third and fourth reference waveguides 82, 83 and 84 have optical path lengths which are $\lambda/8$ longer than those of the first, second and third reference waveguides 81, 82 and 83, respectively. Thus, there is a phase difference of $\pi/2$ between the first and third rectangular signals $S_1$ and $S_3$, and between the second and fourth rectangular signals $S_2$ and $S_4$. Further, there is a phase difference of $\pi/4$ between the first rectangular signal $S_1$ and second $S_2$, between the second $S_2$ and third $S_2$, and between the third $S_3$ and fourth $S_4$, respectively.

A count pulse is generated by one shot circuits 156–159, 256–259 upon the rise and decay of each rectangular signal $S_1$, $S_2$, $S_3$ and $S_4$. The count pulses are outputted from NOR gates 166 and 266 via AND gates 162–165, which pulses are generated each time the corner cube prism 34 has moved a distance of $\lambda/4$. The count pulses outputted from the NOR gate 166 have a phase difference of $\pi/4$ relative to those outputted from the NOR 266. One count pulse is therefore outputted from a NOR gate 301 each time the corner cube prism 34 has moved a distance of $\lambda/16$, whereby the distance over which the prism 34 has moved can be determined to an accuracy of $\lambda/16$.

When the corner cube prism 34 is moved in the -x-direction, a count pulse is generated by the one-shot circuits 156–159 and 256-259 each time the prism has moved a distance of $\lambda/8$. The count pulses are outputted from NOR gates 176 and 276 via AND gates 172–175 and 272–275. Since the count pulses outputted from the NOR gate 176 and the count pulses from another NOR gate 276 have a phase difference of $\pi/4$, the distance over which the corner cube prism 34 has moved can be determined to an accuracy of $\lambda/16$.

The above-described embodiment uses directional couplers for transferring part of the beam from the exit waveguide to the first through fourth reference waveguides 81–84. Alternatively, a branching waveguide may be used which splits the beam into three.

Figure 8:
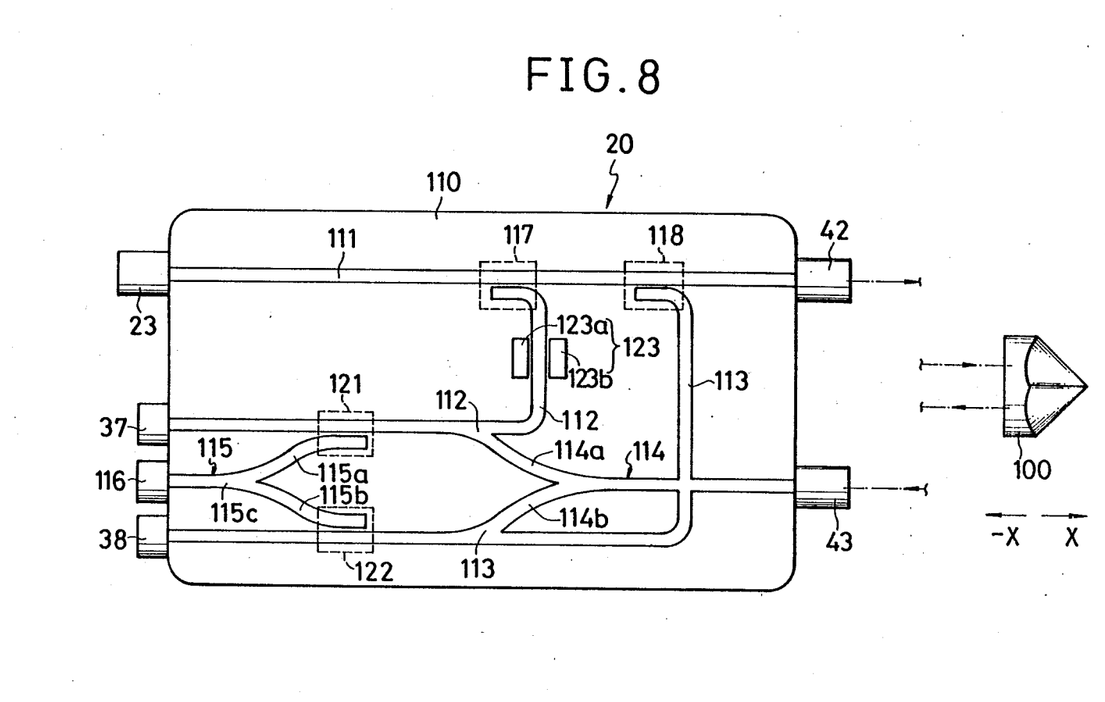
FIG. 8 is a daiagram showing the construction of a third embodiment of the present invention which achieves the second object described above.

FIG. 8 shows the construction of an integrated-photocircuit interferometer 20 which is another embodiment of the present invention which achieves the above-described second object.

The integrated-photocircuit interferometer 20 comprises a thin-walled substrate 110.

The thin-walled substrate 110 has a laser 23 such as a semiconductor laser, as well as three photodetectors 37, 38 and 116, mounted on one end face thereof, and further has an exit rod lens 42 and an inlet rod lens 43 mounted on the opposite end thereof.

The substrate 110 further has formed therein: an exit waveguide 111 which connects the laser 23 to the exit rod lens 42; reference waveguides 112 and 113 which cause transfer of light power from the exit waveguide 111; an inlet waveguide 114 which splits the incident beam of light from the inlet rod lens 43 into two branch beams which are guided to the first and second photodetectors 37 and 38 respectively: and optical path length adjusting waveguide 115 which will unite the branch beams of light propagated through the branch waveguides 114a and 114b of the inlet waveguide 114 so as to cause these branch beams to interfere with each other and which will guide the resultant beam of light to the third photodetector 116.

One sides of the reference waveguides 112 and 113, which constitute first and second directional couplers 117 and 118, are formed parallel to and 2 or 3 μm away from the exit waveguide 111. The first and second photodetectors 37 and 38 are optically coupled to the branch waveguides 114a and 114b of the inlet waveguide 114. Branches 115a and 115b of the optical path length adjusting waveguide 115 are formed parallel with the branch waveguides 114a and 114b, and constitute third and fourth directional couplers 121 and 122. For transfer of part of the power of light, the directional couplers 117, 118, 121 and 122 have coupling lengths other than the complete coupling length. The branch waveguides 114a and 114b of the inlet waveguide 114 join the reference waveguides 112 and 113 at joining portions 119 and 120, respectively.

The reference waveguide 112 is provided with optical path length adjusting means 123 comprising a pair of electrodes 123a and 123b disposed on opposite sides thereof. The optical path length adjusting means 123 allows to cause electro-optical effect which changes the refractive index of the reference waveguide 112, thereby changing the optical path length thereof as desired.

Next, the operation of this integrated-photocircuit interferometer 20 will be described. In use of the interferometer 20, firstly an adjustment is made, and secondly distance measurement is made using the corner cube prism 100.

The adjustment is made so as to adjust to $\pi/2$ the phase difference between the reference beams emitted from the laser 23 and reaching the photodetectors 37 and 38 via the reference waveguides 112 and 113, respectively.

The laser 23 will, when energized, emit coherent measurement light which is propated through the straight exit waveguide 111 toward the exit rod lens 42, and part of the light is transferred to the reference waveguides 112 and 113 through the first and second directional couplers 117 and 118. Since the measurement light from the inlet waveguide 114 interferes with the adjusting work, a shutter may be used to prevent the measurement light from entering the inlet waveguide 114 when the corner cube prism 100 has been set in position and the beam of light from the exit rod lens 42 can reach the inlet rod lens 43.

Part of the coherent light propagated through each of the branch waveguides 114a and 114b is transferred to the branches 115a and 115b of the optical path length adjusting waveguide 115 by the third and fourth directional couplers 121 and 122, respectively. Interference of the transferred coherent light occurs at the joining portion 115c of the optical path length adjusting waveguide 115, and the resultant light is supplied to the third photodetector 116. The output from the third photodetector 116 will change sinusoidally depending on the interference of the light, as in the previously described embodiments. Using such output, it is possible to determine the phase difference between the light waves, emitted from the laser 23 and reaching the joining portion 115c via the reference waveguide 112, and the light waves, reaching the joining portion 115c via the other reference waveguide 113.

In this interferometer 20, the optical path length difference between the two optical paths is adjusted to a value of $(N+\frac{1}{4})\lambda$ by adjusting the voltage applied between the electrodes 123a and 123b of the optical path length adjusting means 123 while detecting the third photodetector 116, here N being an integer.

Figure 9:
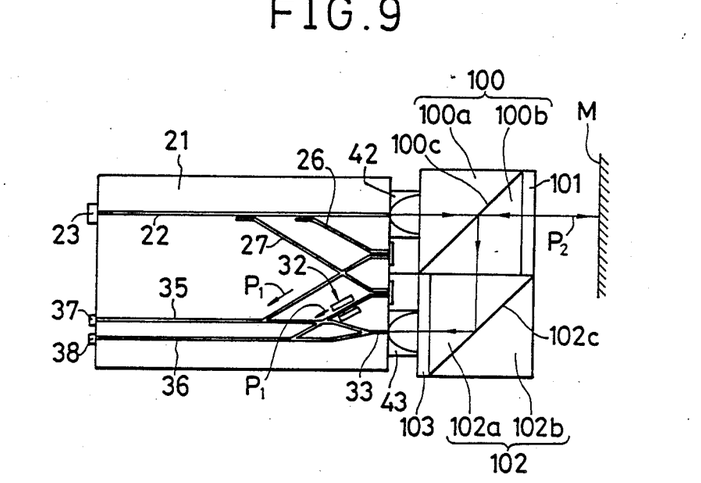
FIG. 9 is a diagram showing the construction of a fourth embodiment of the present invention which achieves the third object described above.

FIG. 9 shows a fourth embodiment of the present invention which achieves the third object previously described.

In this embodiment, the laser 23 emits linearly polarized coherent light P. The coherent light P is emitted into the exit waveguide 22 and is propagated therethrough as a transverse electric wave. The rod lens 42 is of the graded-index type, with which a quarter-wave plate to be described later, and a polarized-beam splitter 100 are associated. The polarized-beam splitter 100 cooperates with a total reflection prism to consitute measurement light polarizing means, and comprises two prisms 100a and 100b. 100c designates a reflecting surface.

The coherent light P is emitted from the rod lens 42 as a parallel beam of rays. The coherent light P can pass through the reflecting surface 100c when it is of the P-polarization. The coherent light P however is reflected by the reflecting surface 100c when it is of the S-polarization.

On one side of the polarized-beam splitter 100, there is provided a quarter-wave plate 101 for converting linearly polarized coherent light P into circularly polarized coherent light P. The coherent light P emitted from the rod lens 42 is converted by the quarter-wave plate 101 from linear polarization to circular polarization. The circularly polarized coherent light P is guided as measurement light $P_2$ to a plane mirror M, and is reflected by this. The measurement light $P_2$ reflected by the plane mirror M is again reflected by the quarter-wave plate 101. The measurement light $P_2$ becomes linearly polarized light while passing through the quarter-wave plate 101. Then, the direction of polarization of the measurement light $P_2$ is turned through an angle of 90°, so than the measurement light $P_2$ reflected back by the plane mirror M is converted into S-polarization light as it passes through the quarter-wave plate 101.

The measurement light $P_2$ of S-polarization from the mirror is therefore reflected by the reflecting surface 101c. A total reflection prism 102 is provided in the passage of the measurement light $P_2$ of S-polarization. The total reflection prism 102 comprises two prisms 102a and 102b, and 102c designates a reflecting surface thereof. A half-wave plate 103 is provided between the total reflection prism 102 and the rod lens 43. The half-wave plate 103 acts as mode setting means which has a function of turning the direction of polarization through 90°. The measurement light $P_2$ of S-polarization which entered the total reflection prism 102 is reflected by the reflecting surface 102c and then enters the half-wave plate 103.

The measurement light $P_2$ of S-polarization is converted into measurement light $P_2$ of P-polarization and enters the inlet waveguide 33. The meaurement light $P_2$ of P-polarization interferes with the reference light $P_1$ which entered the inlet waveguide 33 via the reference waveguides 26 and 27. The resultant light of the measurement lights $P_1$ and $P_2$ is guided to the photodetectors 37 and 38 and is converted into interference signals. The reference waveguides 26 and 27 are connected between the exit and inlet waveguides 22 and 33 by means of directional couplers 24 and 25, respectively. The measurement light $P_2$ reflected back by the plane mirror M is reflected by the the polarized-beam splitter 100 toward the total reflection prism 102, and therefore returning back of any of the measurement light $P_2$ to the laser 23 is prevented, so that the output wavelength of the light source can be stable and accurate length measurement can be carried out.

Figure 10:
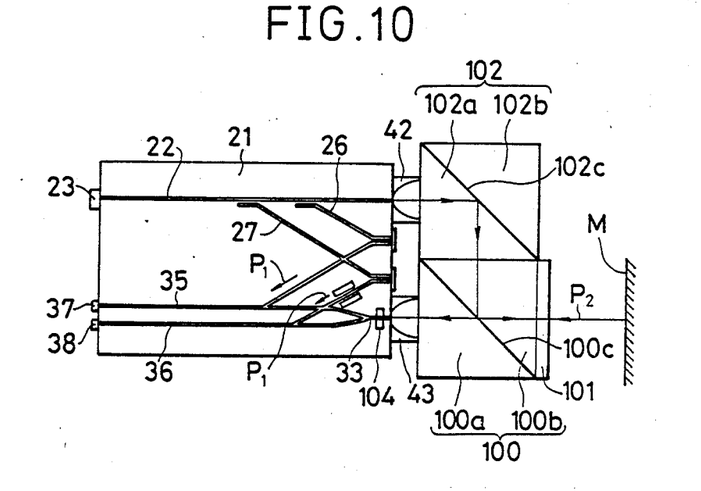
FIG. 10 is a diagram showing the construction of a fifth embodiment of the present invention which also achieves the third object.

FIG. 10 shows a fifth embodiment of the present invention which achieves the third object previously described. In this embodiment, the rod lens 42 has a total reflection prism 102 associated therewith, while the other rod lens 43 has a polarized-beam splitter 100. Here, the laser 23 emits coherent light P of S-polarization. The coherent light P of S-polarization is reflected by the reflecting surfaces 102c and 100c of the total reflection prism 102 and of the polarized-beam splitter 100. A quarter-wave plate 101 is provided on one side of the polarized-beam splitter 100. The measurement light $P_2$ is converted into circularly polarized light after passing through the quarter-wave plate 101, and is directed to the plane mirror M. The circularly polarized measurement light $P_2$ is converted into light of P-polarization while passing through the quarter-wave plate 101, and then enters the polarized-beam splitter 100.

The measurement light $P_2$ of P-polarization passes through the reflecting surface 100c and enters the inlet waveguide 33. The inlet waveguide 33 has mode setting means 104 provided between the rod lens 43 and a directional coupler 28b. The mode setting means 104 has a function of turning the plane of polarization of the measurement light $P_2$ propagated through the inlet waveguide 33 by applying a magnetic field to the inlet waveguide 33 which produces magneto-optical effect. The measurement light $P_2$ which entered the inlet waveguide 33 as P-polarization light is thus converted into S-polarization light. Thus the measurement light $P_2$, which entered the inlet waveguide 33 and was converted into S-polarization in the inlet waveguide, interferes with the measurement light $P_1$ of S-polarization, which was guided into the inlet waveguide 33 via the reference waveguides 26 and 27.

Figure 11:
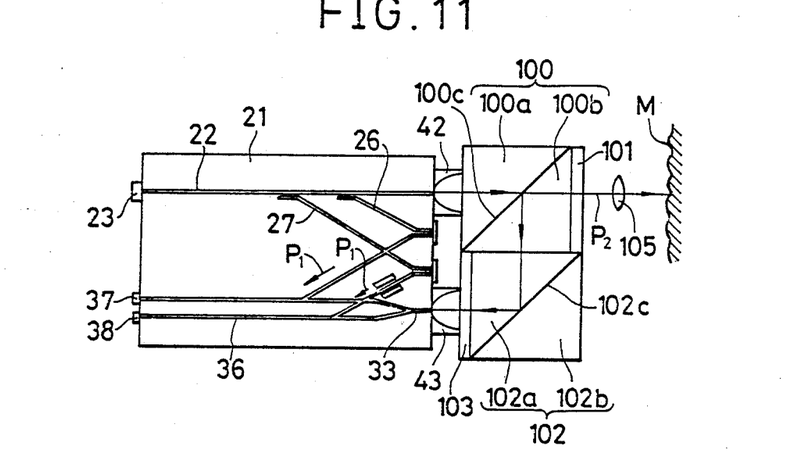
FIG. 11 is a diagram showing the construction of a sixth embodiment of the present invention which also achieves the third object.

FIG. 11 shows a sixth embodiment of the present invention which achieves the third object previously described. This is similar to the one shown in FIG. 9 but differs from it in that a rough surface M' is used in place of a plane mirror M which reflects the measurement light $P_2$. In this embodiment, the rough surface M' is provided at the focus of a convex lens 105.

Figure 12:
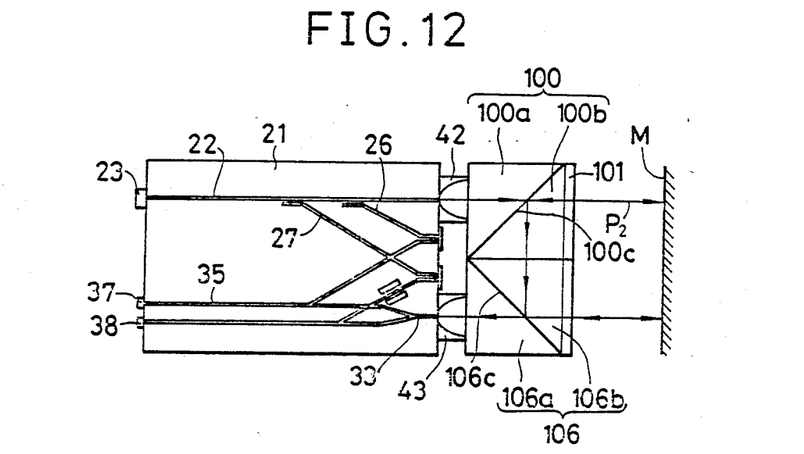
FIG. 12 is a diagram showing the construction of a seventh embodiment of the present invention which also achieves the third object.

FIG. 12 shows a sixth embodiment of the present invention which achieves the third object previously described. In this embodiment, the measurement light $P_2$ is reflected by a plane mirror M twice.

Here, the measurement light $P_2$ emitted from the rod lens 42 enters a polarized-beam splitter 100. The measurement light $P_2$ emitted from the rod lens 42 is of P-polarization. Therefore, the measurement light $P_2$ passes through the polarized-beam splitter 100. It is converted by a quarter-wave plate into circularly polarized measurement light $P_2$ and is reflected by a plane mirror M. The measurement light $P_2$ reflected from the plane mirror M is again converted by the quarter-wave plate 101 into S-polarization light and enters the polarized-beam splitter 100. The measurement light $P_2$ of S-polarization is reflected by the reflecting surface 100c and enters a second polarized-beam splitter 106. The second polarized-beam splitter 106 comprises two prisms 106a and 106b, and 106c designates a reflecting surface. The measurement light $P_2$ of S-polarization is refleccted by the reflecting surface 106c. The polarized-beam splitter 106 has a quarter-wave plate 107 provided on one side thereof. The S-polarization measurement light $P_2$ reflected by the polarized-beam splitter 106 becomes circularly polarized and proceeds toward the plane mirror M and is reflected back by this plane mirror.

The circularly polarized measurement light $P_2$ reflected by the plane mirror M again passes through the quarter-wave plate 107 and becomes P-polarization light and enters the second polarized-beam splitter 106.

Since the measurement light $P_2$ which entered the polarized-beam splitter 106 is of P-polarization, it can pass through the reflecting surface 106c and enter the rod lens 43. This embodiment, in which the measurement light $P_2$ is reflected twice by the plane mirror M, allows to avoid the effect of movements of the plane mirror.

What is claimed is:

1. An integrated-photocircuit interferometer with a thin-walled substrate having formed therein:
   an exit waveguide for directing coherent light for measurement from a light source toward an object;
   an inlet waveguide having a plurality of branch waveguides for receiving said light for measurement reflected from said object and for guiding said received light through said plurality of branch waveguides to a corresponding plurality of photodetectors; and
   reference waveguides optically connecting said exit waveguide to said branch waveguides for extracting a plurality of reference beams from the light for measurement propagating through said exit waveguide and for guiding each of said reference beams into a corresponding one of said branch waveguides, said reference waveguide providing different optical path length differences for said plurality of reference beams.

2. An integrated-photocircuit interferometer as claimed in claim 1, wherein at least one of said plurality of reference waveguides has optical path length adjusting means for adjusting the optical path length differences.

3. An integrated-photocircuit interferometer as claimed in claim 2, wherein said optical path length adjusting means comprises electrodes.

4. An integrated-photocircuit interferometer as claimed in claim 2, wherein said thin-walled substrate is provided with:
   an adjusting waveguide passage formed in said thin-walled substrate and optically connected to each of the branch waveguides and guiding the reference beams from the branch waveguides to an adjustment photodetector for adjusting the difference between the optical path lengths of the plurality of reference beams, wherein said optical path adjusting means can be adjusted depending on the output from the adjustment photodetector.

5. An integrated-photocircuit interferometer as claimed in any of claims 1 through 4, further comprising:
   a light source for generating linearly polarized coherent light for measurement; and
   measurement-light polarizing means provided in said thin-walled substrate for polarizing said measurement light reflected from said object in such a manner that said reflected measurement light will not enter said exit waveguide but will enter said inlet waveguide.

6. An integrated-photocircuit interferometer as claimed in any of claims 1 through 4, wherein two branch waveguides are provided.

7. An integrated-photocircuit interferometer as claimed in any of claims 1 through 4, further comprising:
   a light source for generating linearly polarized coherent light for measurement; and
   measurement-light polarizing means provided in said thin-walled substrate for polarizing said measurement light reflected from said object in such a manner that said reflected measurement light will not enter said exit waveguide but will enter said inlet waveguide, wherein said reference waveguides are constituted by branch waveguides.

8. An integrated-photocircuit interferometer as claimed in any of claims 1 through 4, wherein two branch waveguides are provided, further comprising:

a light source for generating linearly polarized coherent light for measurement; and measurement-light polarizing means provided in said thin-walled substrate for polarizing said measurement light reflected from said object in such a manner that said reflected measurement light will not enter said exit waveguide but will enter said inlet waveguide.

* * * * *